A. Smith,
Hay Fork.
No. 80,839.
Patented. Aug. 11. 1868.
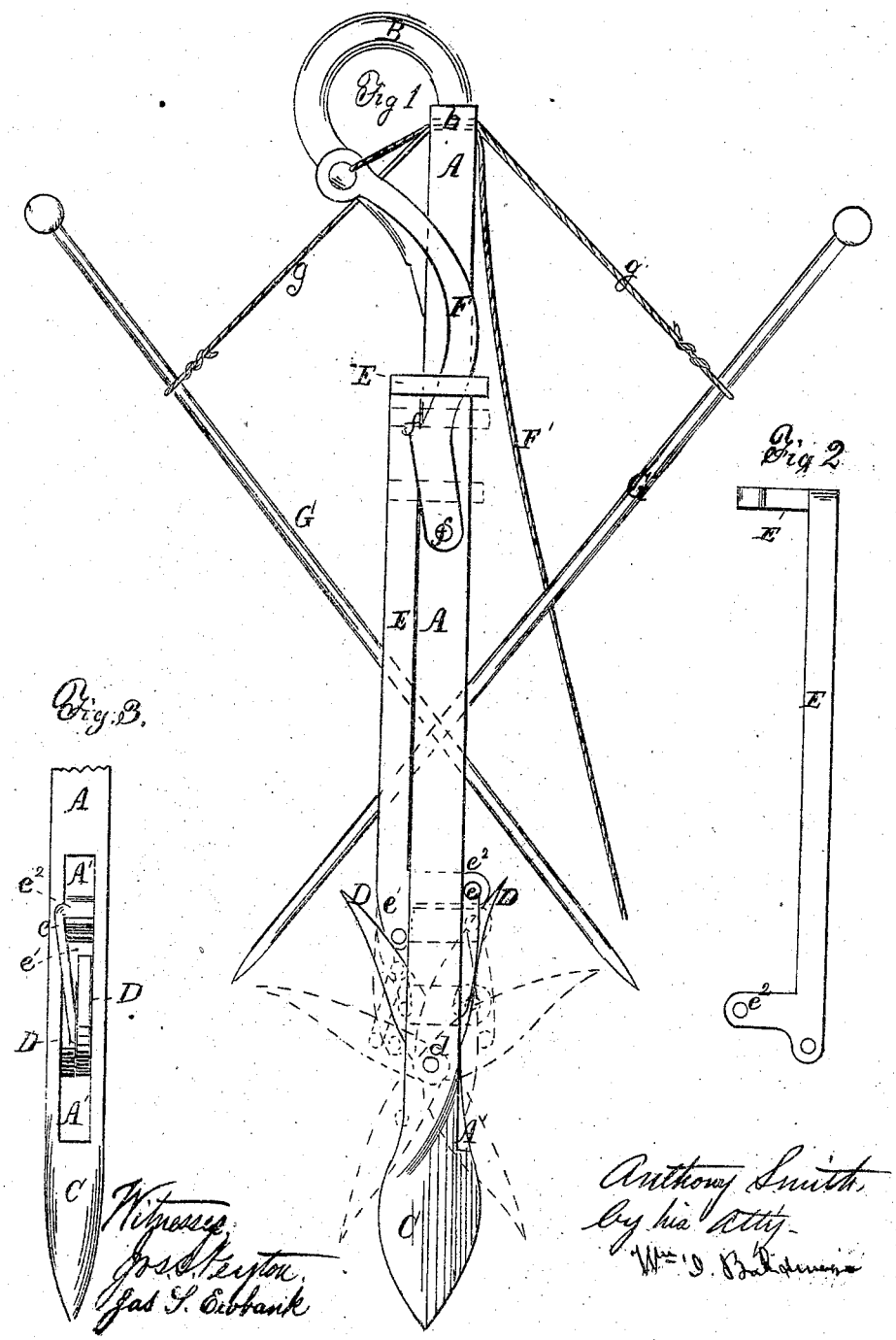

United States Patent Office.

ANTHONY SMITH, OF SCHELLSBURG, PENNSYLVANIA.

Letters Patent No. 80,839, dated August 11, 1868.

IMPROVEMENT IN HORSE HAY-FORKS.

*The Schedule referred to in these Letters Patent and making part of the same.*

TO ALL WHOM IT MAY CONCERN:

Be it known that I, ANTHONY SMITH, of Schellsburg, in the county of Bedford, and State of Pennsylvania, have invented certain new and useful Improvements in Horse Hay-Forks, of which the following is a full, clear, and exact description, reference being had to the accompanying drawings, which make part of this specification, and in which—

Figure 1 represents a view in elevation of one side of a hay-fork embracing my improvements.

Figure 2 represents a similar view of the sliding bar, which moves and locks the teeth, detached.

Figure 3 represents an edge view of the lower part of the fork.

My invention has for its object the production of a strong, simple, and effective hay-fork, the teeth of which can be automatically locked, without the use of springs, when lifting the load; and also one in which the load may be compressed, while being lifted, to avoid scattering the hay.

The improvements herein claimed consist—

First, in a novel method of combining, in a hay-fork, a shank or main bar; pivoted teeth to grasp the hay; a sliding bar or pitman, linked or pivoted to the teeth, and arranged outside of and parallel with the main bar; a locking-lever pivoted on and oscillating in a plane parallel with the main bar; and a loop on the sliding bar embracing both the shank and locking-bolt.

Second, in a novel method of combining, in a hay-fork, a shank; a locking-lever vibrating on the shank; a loop, embracing the shank, and attached to a sliding-bar having a laterally-projecting foot working in a slot in the bar, and connected, by linked connections, with teeth also pivoted to work in a slot in the bar.

Third, in a novel method of combining, with a slotted shank, a spear-head, arranged with its edges diagonal to the slot of the shank; pivoted teeth, oscillating in the slot in the shank; a sliding bar, and a self-acting locking-device.

Fourth, in a novel method of combining, in a horse hay-fork, a shank, a sliding link, and a lever vibrating on a pivot on the shank, in a plane parallel therewith, and which is thrown into position to lock the teeth, when lifting, by the sliding of the loop on the shank as the teeth are turned up by the descent of the shank into the hay.

Fifth, in a novel method of compressing the load, before lifting it, by means of pins or skewers inserted into the load after it is grasped by the teeth.

In the accompanying drawings, which show all my improvements embodied in one apparatus, a rectangular shank, A, is shown as provided with an eye, B, for the attachment of the hoisting-rope, and with a spear, C, to penetrate the hay. The edges of this spear, it will be observed, are arranged diagonally to the sides of the shank or to its slot, thus affording a larger cutting-surface when entering the hay.

The teeth or lifting-prongs D oscillate freely in a vertical plane on a pivot, $d$, in the slot A' of the shank, and are, respectively, connected by pin-jointed links $e\ e^1$ to the lower end of a sliding bar, E, and to a toe or projection, $e^2$, on the bar. This toe extends through the slot, and the pivot of the link $e$ prevents its retraction, and thus serves as a guide to keep the sliding bar E parallel with its shank.

The upper end of the sliding bar is bent round the shank, so as to form a loop, E', which guides that end of the bar.

A locking-lever, F, is pivoted at $f$ to the shank, so as to oscillate parallel therewith. It is enclosed by the loop E', which thus serves as a guide to keep it in place, and is provided with an eye at its upper end for the attachment of the tripping-rope F', which passes through a hole, $b$, in the top of the shank. A shoulder, $f'$, on the lever, acts as a stop, to limit the descent of the teeth when lifting, and thus lock them in position.

The lever is curved in such manner that, as the loop rises, the shoulder is pressed under the loop.

In operation, the fork descends into the hay with the teeth in the position shown in the blue lines in fig. 1, where, it will be seen, they project beyond the shank. As the spear C penetrates the hay, the teeth rise under the hay into the position shown in red lines, carrying up the loop E'. As soon as the latter passes above the shoulder $f'$, the lever F falls to that side, and the shoulder comes under the loop. As the fork rises, the loop falls on the shoulder and is locked there. Before lifting the load, pins G are inserted crosswise into the hay, as shown in the drawings. These pins are suspended by a cord, $g$, from the shank, so that when the shank rises, their upper ends are drawn together, thus compressing the hay to be lifted.

The load is discharged by withdrawing the shoulder $f'$ from beneath the loop, when the bar and teeth drop into the position shown by the blue lines, and the hay is discharged.

In descending into the hay, the teeth may be turned up into the position shown in black lines, in which event the fork is to be forced down until the teeth are below the hay. When the fork rises, they will assume the position shown in red, and the operation will be the same as before.

It will thus be seen that my fork possesses the capacity of seizing the load whether the teeth are raised or lowered in entering the hay.

The rods G are more especially intended for heavy loads, and may ordinarily be dispensed with, if preferred.

What I claim as my invention, and desire to secure by Letters Patent, is—

1. The combination, in a horse hay-fork, of the shank, the pivoted teeth, the sliding bar, the vibrating locking-lever, and the loop, the combination being and operating substantially as set forth.

2. The combination of the shank, the locking-lever, and the sliding loop, with the slide-bar, having a lateral projection on its foot working in the slot of the shank, and pivoted to the teeth by links, for the purposes specified.

3. The combination, as set forth, of the rectangular slotted shank, the diagonally-arranged spear-head, the oscillating teeth, the slide-bar, the loop, and the locking-lever, for the purposes specified.

4. The combination, in a horse hay-fork, of a shank, a self-locking lever pivoted on and vibrating parallel with the shank, and a loop sliding on the shank and embracing the shank and locking-lever, and operating the latter by its ascent, as set forth.

5. The combination, substantially as set forth, with a horse hay-fork, of pins or skewers, to be inserted crosswise into the load, to bind together and compress the hay.

In testimony whereof, I have hereunto subscribed my name.

ANTHONY SMITH.

Witnesses:
J. J. CLARKE,
RICHARD S. MOWRING.